(12) United States Patent
Fujihara et al.

(10) Patent No.: US 9,266,412 B2
(45) Date of Patent: Feb. 23, 2016

(54) VEHICLE SIDE DOOR STRUCTURE

(75) Inventors: Akito Fujihara, Toyota (JP); Nobuyuki Torii, Nagoya (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/370,343

(22) PCT Filed: Jan. 11, 2012

(86) PCT No.: PCT/JP2012/050369
§ 371 (c)(1),
(2), (4) Date: Jul. 2, 2014

(87) PCT Pub. No.: WO2013/105228
PCT Pub. Date: Jul. 18, 2013

(65) Prior Publication Data
US 2014/0375078 A1    Dec. 25, 2014

(51) Int. Cl.
*B60J 5/00* (2006.01)
*B60J 5/04* (2006.01)
(52) U.S. Cl.
CPC .............. *B60J 5/0443* (2013.01); *B60J 5/0437* (2013.01); *B60J 5/0461* (2013.01)
(58) Field of Classification Search
CPC ......... B60J 5/0443; B60J 5/042; B60J 5/0452
USPC ...................................................... 296/146.6
See application file for complete search history.

(56) References Cited

U.S. PATENT DOCUMENTS

| | | | |
|---|---|---|---|
| 5,599,057 A | 2/1997 | Hirahara et al. | |
| 8,371,639 B2 * | 2/2013 | Danaj et al. | 296/146.6 |
| 2007/0145770 A1 | 6/2007 | Katou et al. | |
| 2009/0045650 A1 * | 2/2009 | Endo et al. | 296/187.12 |

FOREIGN PATENT DOCUMENTS

| | | | |
|---|---|---|---|
| JP | 7-117476 A | | 5/1995 |
| JP | 9-175180 | * | 12/1995 |
| JP | 2003-2058 A | | 1/2003 |
| JP | 2007-176223 A | | 7/2007 |
| JP | 2007-203895 A | | 8/2007 |
| JP | 2008-44575 A | | 2/2008 |

* cited by examiner

*Primary Examiner* — Joseph D Pape
(74) *Attorney, Agent, or Firm* — Sughrue Mion, PLLC (57) ABSTRACT

A vehicle side door structure is equipped with a door inner panel and a door outer panel. An impact beam is disposed between the door inner panel and the door outer panel. The impact beam is disposed in such a way that its lengthwise direction coincides with the vehicle front and rear direction. An impact beam extension is disposed on a front end portion of the impact beam. The impact beam extension is overlaid on a first opposing wall portion formed on a vehicle front and rear direction front end portion side of the door inner panel, is welded to the first opposing wall portion. Furthermore, the impact beam extension overlaps at least part of a through hole serving as an example of a weak portion formed in a second opposing wall portion of the door inner panel as seen from the outer side in the vehicle width direction.

4 Claims, 6 Drawing Sheets

VEHICLE SIDE DOOR STRUCTURE

CROSS REFERENCE TO RELATED APPLICATIONS

This application is a National Stage of International Application No. PCT/JP2012/050369 filed Jan. 11, 2012, the contents of all of which are incorporated herein by reference in their entirety.

TECHNICAL FIELD

The present invention relates to a vehicle side door structure.

BACKGROUND ART

A vehicle side section structure equipped with a vehicle side door having inside a pipe-like impact beam extending in a vehicle front and rear direction is known (e.g., patent document 1). Extensions are welded to both lengthwise direction (vehicle front and rear direction) end portions of the impact beam. The extensions are welded to impact beam attachment portions disposed on a vehicle front and rear direction front end side and rear end side of a door inner panel that configures the vehicle side door.

Patent Document 1: Japanese Patent Application Laid-open (JP-A) No. 2007-203895

DISCLOSURE OF INVENTION

Technical Problem

Here, in the technology disclosed in patent document 1, the impact beam attachment portions are disposed on a vehicle width direction outer side of a pillar. Consequently, when the pillar is torsionally deformed about its axis at the time of a vehicle side impact (hereinafter simply called a "side impact"), the impact beam attachment portions are pushed outward in the vehicle width direction by the pillar. Because of this, it becomes easy for the extensions to detach from the impact beam attachment portions, and there is the potential for the impact beam to no longer function as a beam (a fixed-fixed beam). As measures to counter this, it is conceivable to reinforce the extensions or enhance the welding strength between the impact beam attachment portions and the extensions, but these measures lead to an increase in weight and an increase in cost.

In consideration of these circumstances, it is an object of the present invention to obtain a vehicle side door structure that can keep an impact beam extension from detaching from a door inner panel at the time of a side impact.

Solution to Problem

A vehicle side door structure pertaining to a first aspect of the present invention includes: a door inner panel that is disposed along a vehicle front and rear direction, has a vehicle front and rear direction end portion side disposed on a vehicle width direction outer side of a pillar, and is configured to include a first opposing wall portion that is formed on the end portion side and opposes the pillar in the vehicle width direction and a second opposing wall portion that is bent inward in the vehicle width direction with respect to the first opposing wall portion and opposes the pillar in the vehicle front and rear direction; a door outer panel that is disposed on the vehicle width direction outer side of the door inner panel, opposes the door inner panel in the vehicle width direction, and has a peripheral edge portion joined to a peripheral edge portion of the door inner panel; an impact beam that is disposed between the door inner panel and the door outer panel in such a way that its lengthwise direction coincides with the vehicle front and rear direction; and an impact beam extension that is provided at a lengthwise direction end portion of the impact beam, is overlaid on the first opposing wall portion, is welded to the first opposing wall portion, and overlaps at least part of a weak portion formed in the second opposing wall portion as seen from the outer side in the vehicle width direction.

According to the vehicle side door structure pertaining to the first aspect of the present invention, the impact beam is disposed between the door inner panel and the door outer panel. The impact beam is disposed in such a way that its lengthwise direction coincides with the vehicle front and rear direction, and the impact beam extension is provided at the lengthwise direction end portion of the impact beam. The impact beam extension is overlaid on the first opposing wall portion of the door inner panel and is welded to the first opposing wall portion.

Consequently, for example, when the impact beam is displaced inward in the vehicle width direction while curving in such a way as to form a convex shape inward in the vehicle width direction at the time of a side impact, the first opposing wall portion and the second opposing wall portion of the door inner panel are pushed inward in the vehicle width direction by the impact beam extension provided at the lengthwise direction end portion of the impact beam, and the door inner panel as a whole is displaced inward in the vehicle width direction. When the pillar is torsionally deformed about its axis in accompaniment with the displacement of the door inner panel inward in the vehicle width direction, the first opposing wall portion is pushed outward in the vehicle width direction by the torsionally deformed pillar and it becomes easy for the impact beam extension welded to the first opposing wall portion to detach from the first opposing wall portion.

With respect to this, in the first aspect, the weak portion is formed in the second opposing wall portion that is bent inward in the vehicle width direction with respect to the first opposing wall portion. Because of this, it becomes easy for the second opposing wall portion to be crushed inward in the vehicle width direction. Furthermore, the impact beam extension overlaps at least part of the weak portion formed in the second opposing wall portion as seen from the outer side in the vehicle width direction. Consequently, when the impact beam has been displaced inward in the vehicle width direction, the weak portion of the second opposing wall portion is pushed inward in the vehicle width direction by the impact beam extension. Because of this, when the second opposing wall portion is crushed inward in the vehicle width direction taking the weak portion as an origin, the first opposing wall portion is displaced inward in the vehicle width direction. As a result, the first opposing wall portion is kept from being pushed outward in the vehicle width direction by the torsionally deformed pillar, so the impact beam extension is kept from detaching from the first opposing wall portion. Consequently, the function of the impact beam as a beam (a fixed-fixed beam) is maintained.

Moreover, when the first opposing wall portion is displaced inward in the vehicle width direction, the shear deformation of the welded sites between the first opposing wall portion and the impact beam extension is sustained. Consequently, the burden on the welded sites is reduced, so the function of the impact beam as a beam is maintained on a long-term basis.

A vehicle side door structure pertaining to a second aspect of the present invention is the first aspect, wherein the weak portion is positioned between a vehicle up and down direction upper edge portion and lower edge portion of the impact beam extension as seen from the outer side in the vehicle width direction.

According to the vehicle side door structure pertaining to the second aspect of the present invention, the weak portion of the second opposing wall portion is positioned between the vehicle up and down direction upper edge portion and lower edge portion of the impact beam extension as seen from the outer side in the vehicle width direction, so compared to a configuration where the weak portion is not positioned between the upper edge portion and the lower edge portion of the impact beam extension, it becomes easy for the second opposing wall portion to be crushed inward in the vehicle width direction taking the weak portion as an origin at the time of a side impact. Consequently, the first opposing wall portion is kept from being pushed outward in the vehicle width direction by the torsionally deformed pillar, so the impact beam extension is kept from detaching from the first opposing wall portion.

A vehicle side door structure pertaining to a third aspect of the present invention is the first aspect or the second aspect, wherein the weak portion is positioned on a central axis of the impact beam or an extension line of the central axis as seen from the outer side in the vehicle width direction.

According to the vehicle side door structure pertaining to the third aspect of the present invention, the weak portion of the second opposing wall portion is positioned on the central axis of the impact beam or the extension line of the central axis as seen from the outer side in the vehicle width direction, so compared to a configuration where the weak portion is not positioned, for example, on the central axis of the impact beam, it becomes easy for the second opposing wall portion to be crushed inward in the vehicle width direction taking the weak portion as an origin at the time of a side impact. Consequently, the first opposing wall portion is kept from being pushed outward in the vehicle width direction by the torsionally deformed pillar, so the impact beam extension is kept from detaching from the first opposing wall portion.

A vehicle side door structure pertaining to a fourth aspect of the present invention is any one of the first aspect to the third aspect, wherein the weak portion is a through hole formed in the second opposing wall portion, and a central axis of the through hole is positioned on a central axis of the impact beam or an extension line of the central axis as seen from the outer side in the vehicle width direction.

According to the vehicle side door structure pertaining to the fourth aspect of the present invention, the central axis of the through hole serving as the weak portion is positioned on the central axis of the impact beam or the extension line of the central axis as seen from the outer side in the vehicle width direction, so compared to a configuration where the central axis of the through hole is not positioned, for example, on the central axis of the impact beam, it becomes easy for the second opposing wall portion to be crushed inward in the vehicle width direction taking the weak portion as an origin at the time of a side impact. Consequently, the first opposing wall portion is kept from being pushed outward in the vehicle width direction by the torsionally deformed pillar, so the impact beam extension is kept from detaching from the first opposing wall portion.

A vehicle side door structure pertaining to a fifth aspect of the present invention is any one of the first aspect to the third aspect, wherein the weak portion is a through hole, a cutout, a slit, a concave portion, or a convex portion formed in the second opposing wall portion.

According to the vehicle side door structure pertaining to the fifth aspect of the present invention, the impact beam extension can be kept from detaching from the first opposing wall portion at the time of a side impact by a simple configuration wherein a through hole, a cutout, a slit, a concave portion, or a convex portion serving as the weak portion is formed in the second opposing wall portion of the door inner panel. Consequently, the manufacturing cost of the door inner panel can be reduced.

A vehicle side door structure pertaining to a sixth aspect of the present invention is the fourth aspect or the fifth aspect, wherein the through hole is a wire harness through hole, a door hinge bracket attachment hole, a door check through hole, a paint flow-through hole, or a welding reference hole.

According to the vehicle side door structure pertaining to the sixth aspect of the present invention, by using as the weak portion a wire harness through hole, a door hinge bracket attachment hole, a door check through hole, a paint flow-through hole, or a welding reference hole formed in the second opposing wall portion of the door inner panel, the manufacturing cost of the door inner panel can be reduced because it is not necessary to form a new through hole in the second opposing wall portion.

A vehicle side door structure pertaining to a seventh aspect of the present invention is any one of the first aspect to the sixth aspect, wherein a front end portion side serving as the vehicle front and rear direction end portion side of the door inner panel is disposed on the vehicle width direction outer side of a front pillar serving as the pillar, the first opposing wall portion opposes the front pillar in the vehicle width direction, and the second opposing wall portion is disposed on the vehicle front and rear direction rear side of the front pillar and opposes the front pillar in the vehicle front and rear direction.

According to the vehicle side door structure pertaining to the seventh aspect of the present invention, the first opposing wall portion of the door inner panel is kept from being pushed outward in the vehicle width direction in accompaniment with the torsional deformation of the front pillar at the time of a side impact. As a result, the impact beam extension is kept from detaching from the first opposing wall portion. Consequently, the function of the impact beam as a beam (a fixed-fixed beam) is maintained. In particular, the present aspect is effective for a side impact with respect to the vehicle front and rear direction rear side (center pillar side) of the door outer panel.

Advantageous Effects of Invention

As described above, according to the vehicle side door structure pertaining to the present invention, an impact beam extension can be kept from detaching from a door inner panel at the time of a side impact.

BEST MODE FOR CARRYING OUT THE INVENTION

A vehicle side door structure pertaining to an embodiment of the present invention will be described below with reference to the drawings. Arrow FR appropriately shown in the drawings represents a front side in a vehicle front and rear direction, arrow UP represents an upper side in a vehicle up and down direction, and arrow IN represents an inner side (a cabin inside) in a vehicle width direction.

Figure 1:
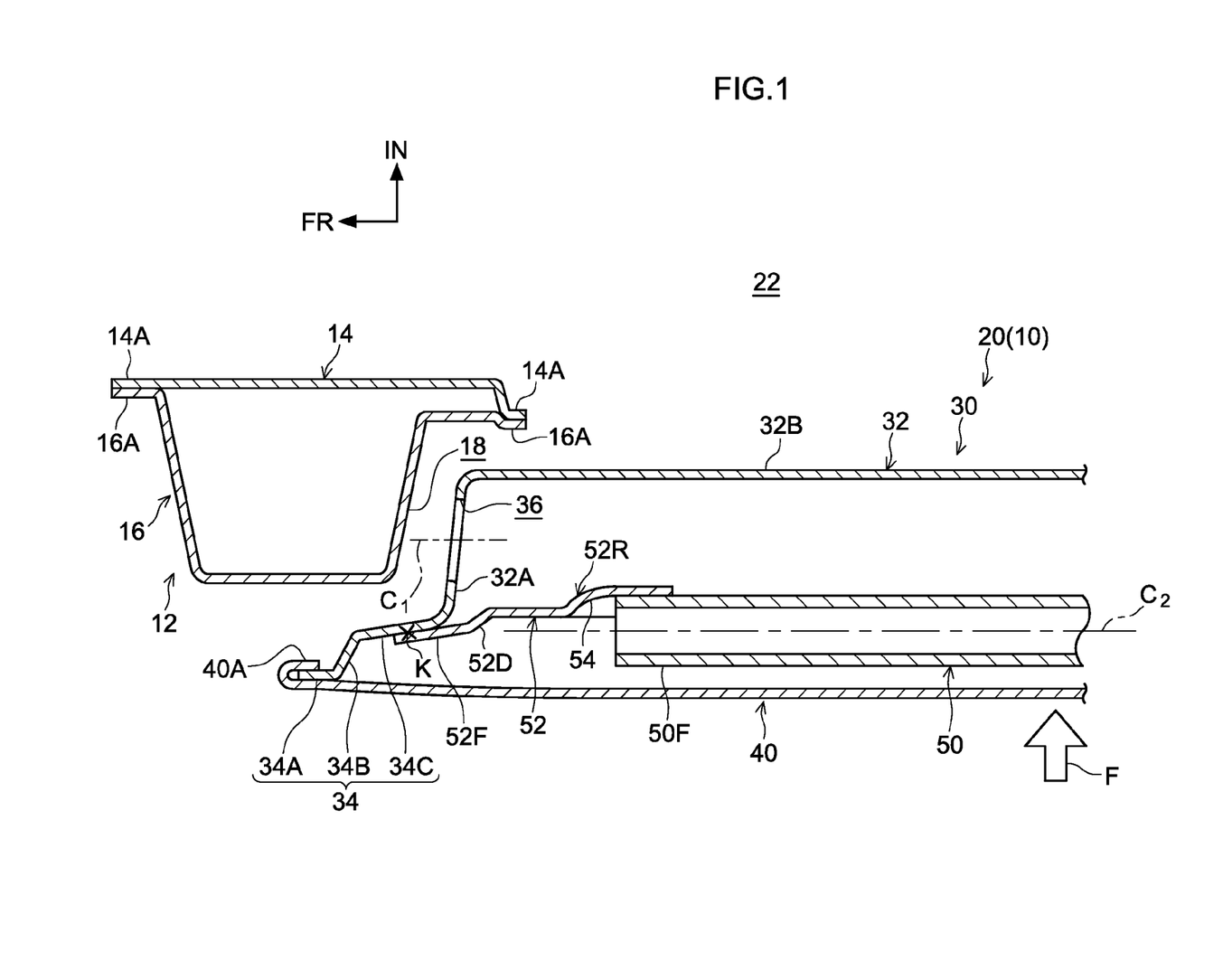
FIG. 1 is a horizontal sectional view showing a vehicle front and rear direction front end portion side of a front side door to which a vehicle side door structure pertaining to an embodiment of the present invention has been applied.

FIG. 1 shows, as an example, a front side door 20 to which a vehicle side door structure 10 pertaining to the present embodiment has been applied. The front side door 20 opens and closes a door opening 18, which is for a passenger to get into and out of the vehicle and is formed between a front pillar 12 and a center pillar (not shown in the drawings) that are disposed apart from one another in the vehicle front and rear direction, and the front side door 20 is rotatably supported on a non-illustrated door hinge disposed at the front pillar 12.

The front pillar 12 is a columnar skeletal member configuring the skeleton of the vehicle body side section and is disposed in such a way that its lengthwise direction coincides with the vehicle up and down direction. The front pillar 12 has a front pillar inner panel 14 and a front pillar outer panel 16. The front pillar outer panel 16 (hereinafter also simply called the "pillar outer panel") 16 is formed in a cross-sectional hat shape that opens inward in the vehicle width direction. The front pillar inner panel (hereinafter also simply called the "pillar inner panel") 14 is disposed on the vehicle width direction inside of the pillar outer panel 16. The pillar inner panel 14 and the pillar outer panel 16 are joined together at their respective flange portions 14A and 16A to configure a structure with a closed cross-section. The non-illustrated center pillar is disposed on the vehicle front and rear direction rear side of the front pillar 12 in such a way that its lengthwise direction coincides with the vehicle up and down direction, and the center pillar configures the skeleton of the vehicle body side section.

The front side door (hereinafter also simply called the "side door") 20 is disposed extending across the front pillar 12 and the center pillar as seen from the outer side in the vehicle width direction in a state in which it has closed the door opening 18. The side door 20 is equipped with a door inner panel 30, which is disposed on the vehicle width direction inside (a cabin 22 side) and configures an inner panel of the side door 20, and a door outer panel 40, which is disposed on the vehicle width direction outer side of the door inner panel 30 and configures an outer panel of the side door 20. The door inner panel 30 and the door outer panel 40 are disposed along the vehicle front and rear direction. Furthermore, the door inner panel 30 and the door outer panel 40 are disposed opposing one another in the vehicle width direction, and their respective peripheral edge portions excluding their upper end portions are joined together by hemming.

The door inner panel 30 is configured to include a panel body portion 32, which is formed in a concave shape that opens outward in the vehicle width direction as seen in a horizontal sectional view, and an extension portion 34, which extends frontward in the vehicle front and rear direction from the open peripheral portion on the vehicle front and rear direction front side of the panel body portion 32. The panel body portion 32 is recessed inward in the vehicle width direction with respect to the extension portion 34 and is disposed between the front pillar 12 and the non-illustrated center pillar in a state in which the side door 20 has closed the door opening 18. The extension portion 34 configures a vehicle front and rear direction front end portion side (end portion side) of the door inner panel 30 and is disposed on the vehicle width direction outer side of the front pillar 12 in a state in which the side door 20 has closed the door opening 18. The configuration of the vehicle front and rear direction front side of the side door 20 in a state in which the side door 20 has closed the door opening 18 will be described in detail below.

A vehicle front and rear direction front end portion 34A of the extension portion 34 configures a peripheral edge portion of the door inner panel 30 and is joined to a peripheral edge portion 40A on the vehicle front and rear direction front side of the door outer panel 40. A first opposing wall portion 34C is formed on the vehicle front and rear direction rear end portion of the front end portion 34A via a step portion 34B that is bent inward in the vehicle width direction. The first opposing wall portion 34C is disposed on the vehicle width direction outer side of the front pillar 12, extends in the vehicle front and rear direction, and opposes the front pillar 12 in the vehicle width direction. A vehicle front and rear direction front end portion 52F of an impact beam extension 52 described later is welded to the first opposing wall portion 34C.

A second opposing wall portion 32A that is bent inward in the vehicle width direction with respect to the first opposing wall portion 34C is formed on the vehicle front and rear direction rear end portion of the first opposing wall portion 34C. The second opposing wall portion 32A extends inward in the vehicle width direction from the rear end portion of the first opposing wall portion 34C and is disposed on the vehicle front and rear direction rear side of the front pillar 12. That is, the second opposing wall portion 32A extends into the space between the front pillar 12 and the non-illustrated center pillar from the rear end portion of the first opposing wall portion 34C. The second opposing wall portion 32A opposes the front pillar 12 in the vehicle front and rear direction and configures a side wall portion on the vehicle front and rear direction front side of the panel body portion 32. Furthermore, a circular through hole 36 serving as an example of a weak portion is formed in the second opposing wall portion 32A. Because of the through hole 36, the vehicle width direction rigidity of the area of the second opposing wall portion 32A around the through hole 36 is lower compared to the vehicle width direction rigidity of other areas of the second opposing wall portion 32A.

An inside wall portion 32B that is bent rearward in the vehicle front and rear direction with respect to the second opposing wall portion 32A is formed on the vehicle width direction inside end portion of the second opposing wall portion 32A. The inside wall portion 32B is disposed along the vehicle front and rear direction and configures the panel body portion 32.

Here, an impact beam 50 that reinforces the side door 20 is disposed between the door inner panel 30 and the door outer panel 40. The impact beam 50 is formed by a cylindrical pipe member, and the impact beam 50 is disposed in the lower portion of the side door 20 in such a way that its lengthwise direction coincides with the vehicle front and rear direction. One lengthwise direction end portion (rear end portion) of the impact beam 50 is joined by welding or the like to a non-illustrated vehicle front and rear direction rear end portion side of the door inner panel 30. An impact beam extension 52, which is joined to the first opposing wall portion 34C of the door inner panel 30, is provided at the other lengthwise direction end portion (hereinafter called the "front end portion") 50F of the impact beam 50.

The impact beam extension (hereinafter also simply called the "extension") 52 is formed by a metal plate member and is disposed opposing the door outer panel 40. An impact beam securing portion 54 recessed inward in the vehicle width direction is formed in a vehicle front and rear direction rear end portion 52R of the extension 52.

Figure 2:
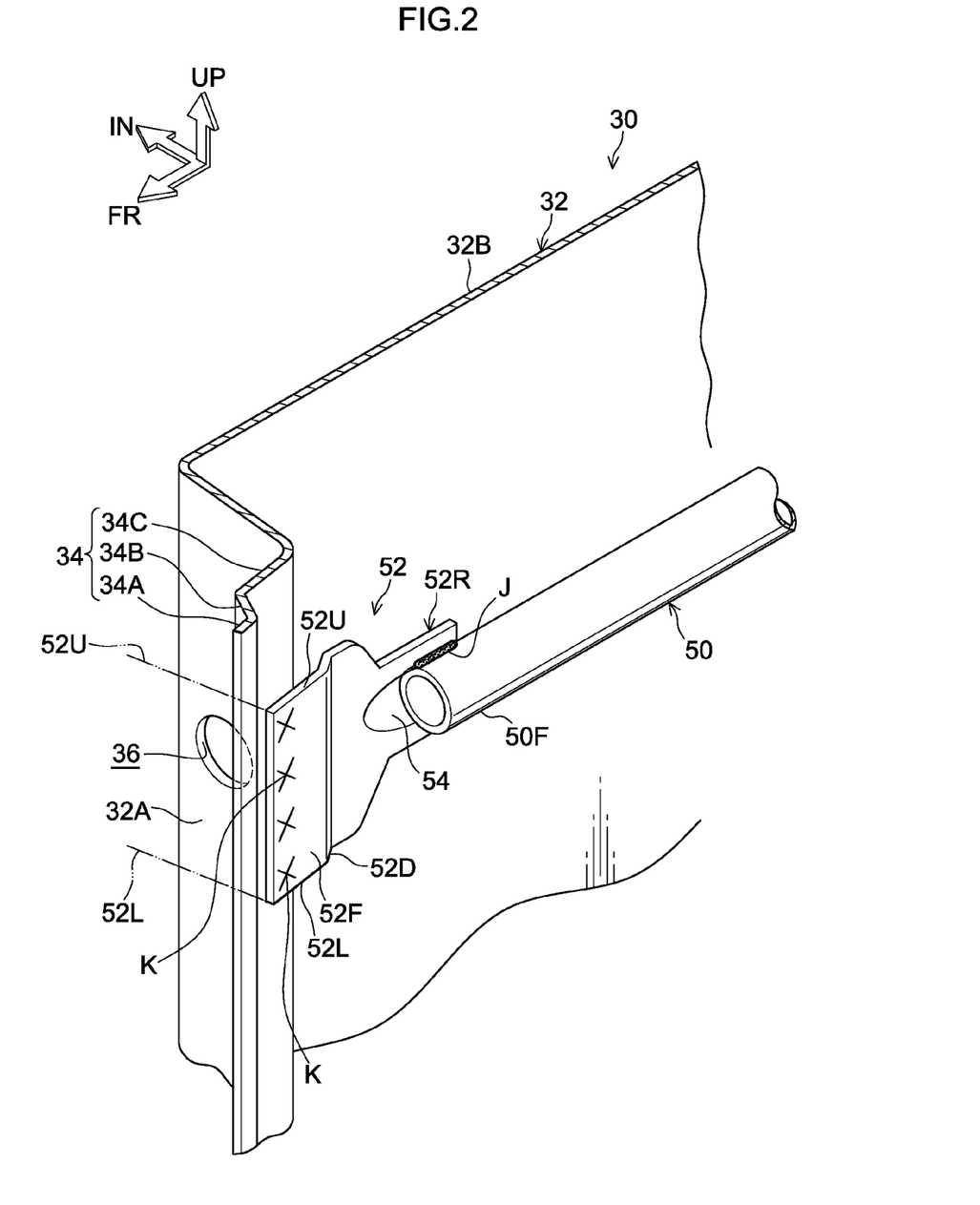
FIG. 2 is a perspective view showing a door inner panel, an impact beam, and an impact beam extension shown in FIG. 1.

As shown in FIG. 2, the front end portion 50F of the impact beam 50 is fitted into the impact beam securing portion 54. The contact site between the impact beam securing portion 54 and the front end portion 50F of the impact beam 50 is welded by arc welding or the like along the lengthwise direction of the impact beam 50. Because of this, the extension 52 is joined to the front end portion 50F of the impact beam 50. Reference sign J represents the welded site between the impact beam securing portion 54 and the front end portion 50F of the impact beam 50.

A step portion 52D that positions the front end portion 52F on the vehicle width direction outer side with respect to the rear end portion 52R is formed between the vehicle front and rear direction front end portion 52F and rear end portion 52R of the extension 52. The front end portion 52F of the extension 52 is overlaid on the first opposing wall portion 34C of the door inner panel 30 from the outer side in the vehicle width direction. The front end portion 52F of the extension 52 is joined to the first opposing wall portion 34C by spot welding at plural (in the present embodiment, four) welded sites K that are adjacent to one another in the vehicle up and down direction.

Furthermore, the extension 52 is disposed in such a way that the through hole 36 formed in the second opposing wall portion 32A of the door inner panel 30 is positioned between a vehicle up and down direction upper edge portion 52U and lower edge portion 52L on the vehicle front and rear direction front end portion side of the extension 52 as seen from the outer side in the vehicle width direction. That is, in the present embodiment, the extension 52 overlaps the entire through hole 36 as seen from the outer side in the vehicle width direction. Because of this, at the time of a side impact, the area of the second opposing wall portion 32A around the through hole 36 is pushed inward in the vehicle width direction by the extension 52.

Figure 3:
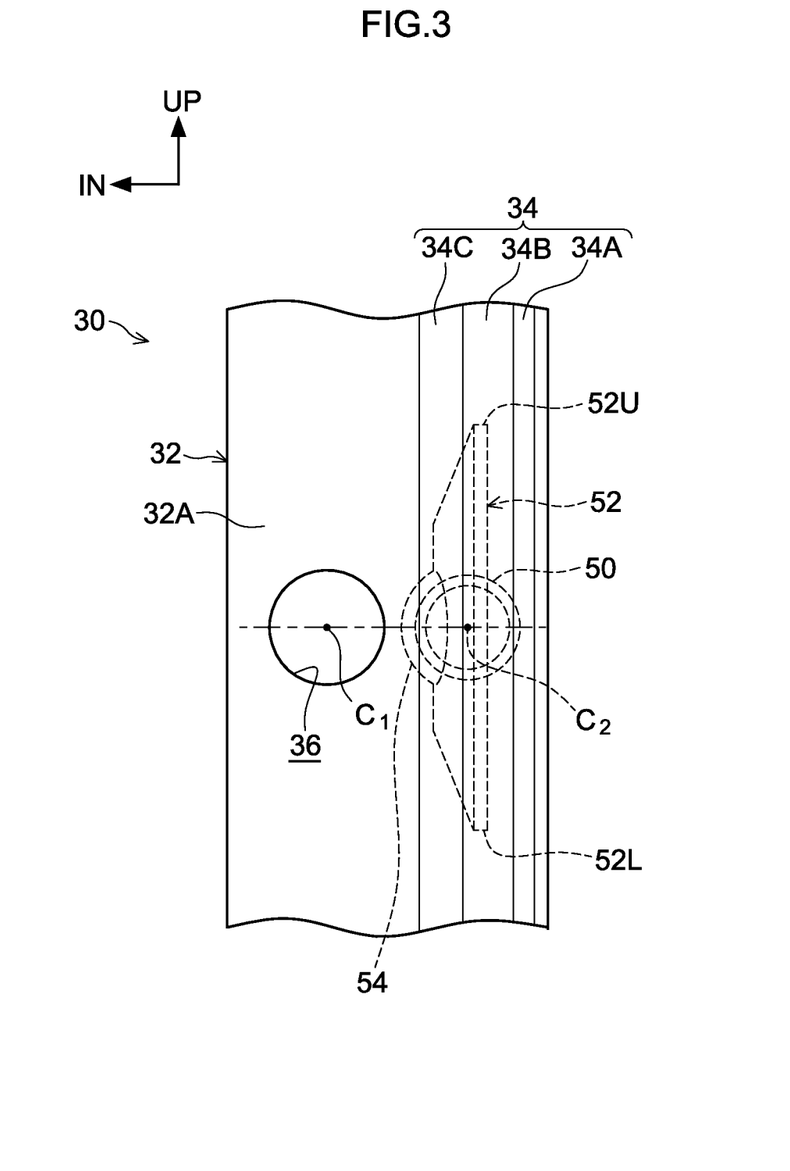
FIG. 3 is a side view of the door inner panel shown in FIG. 1 as seen from a vehicle front and rear direction front side.

Moreover, as shown in FIG. 3, a central axis $C_1$ of the through hole 36 and a central axis $C_2$ of the impact beam 50 are positioned at the same height or substantially the same height. In other words, as shown in FIG. 1, when seen from the outer side in the vehicle width direction, the central axis $C_1$ of the through hole 36 is positioned on an extension line of the central axis $C_2$ of the impact beam 50. Because of this, a side impact load F input to the impact beam 50 at the time of a side impact is efficiently transmitted to the area of the second opposing wall portion 32A around the through hole 36 via the extension 52.

Next, the action of the vehicle side door structure pertaining to the present embodiment will be described.

Figure 4A:
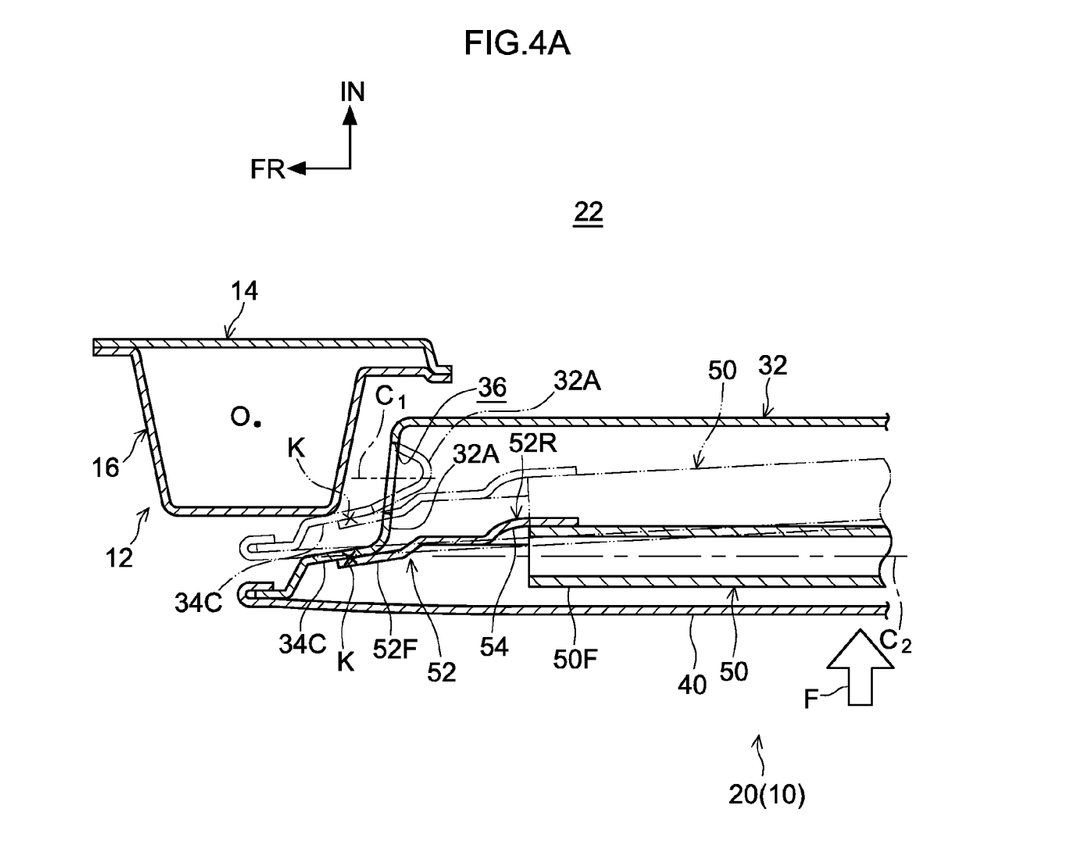
FIG. 4A is a sectional view corresponding to FIG. 1 schematically showing a deformed state, at the time of a side impact, of the front side door shown in FIG. 1.

As shown in FIG. 4A, for example, when the side impact load F heading inward in the vehicle width direction from the outer side in the vehicle width direction acts on the door outer panel 40 at the time of a side impact, the impact beam 50 is pushed toward the cabin 22 side via the door outer panel 40. Because of this, as indicated by the long dashed double-short dashed line, the impact beam 50 is displaced toward the cabin 22 side while curving in such a way as to form a convex shape toward the cabin 22 side using its front end portion 50F and rear end portion (not shown in the drawings) as supports. In accompaniment with the displacement of the impact beam 50 toward the cabin 22 side, the first opposing wall portion 34C and the second opposing wall portion 32A of the door inner panel 30 are pushed toward the cabin 22 side by the extension 52 provided at the front end portion 50F of the impact beam 50.

Figure 5:
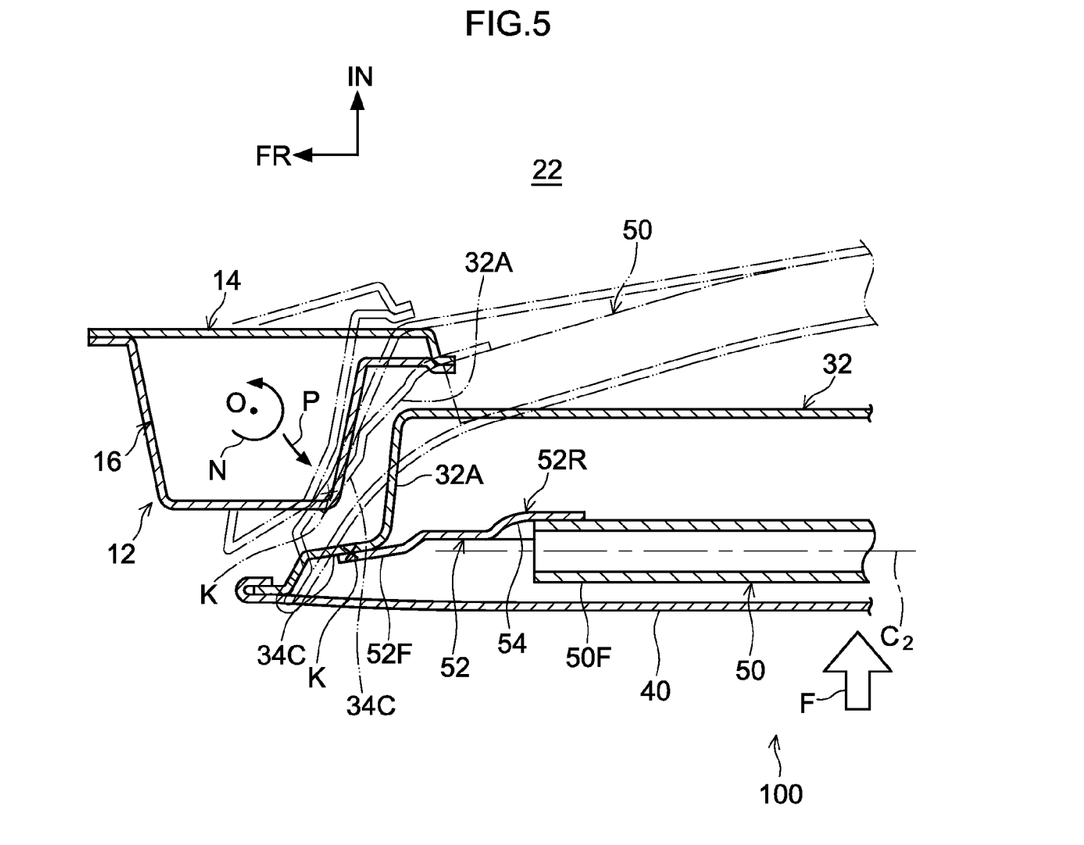
FIG. 5 is a sectional view corresponding to FIG. 4A schematically showing a deformed state, at the time of a side impact, of a front side door and a front pillar to which a vehicle side door structure pertaining to a comparative example has been applied.

Here, in order to further clarify the action of the vehicle side door structure 10 pertaining to the present embodiment, the action of a vehicle side door structure pertaining to a comparative example will be described. FIG. 5 shows a front side door 100 to which the vehicle side door structure pertaining to the comparative example has been applied. In contrast to the side door 20 of the present embodiment, the front side door (hereinafter also simply called the "side door") 100 does not have the through hole 36 formed in the second opposing wall portion 32A of the door inner panel 30. Other configurations of the side door 100 of the comparative example are the same as those of the side door 20 of the present embodiment.

As shown in FIG. 5, in the side door 100 pertaining to the comparative example, when the first opposing wall portion 34C and the second opposing wall portion 32A of the door inner panel 30 are pushed toward the cabin 22 side via the extension 52 at the time of a side impact, as indicated by the long dashed double-short dashed line, the door inner panel 30 is displaced as a whole toward the cabin 22 side because of the vehicle width direction rigidity of the second opposing wall portion 32A. Because of this, the vehicle front and rear direction rear end portion side of the front pillar 12 is pushed toward the cabin 22 side, and the front pillar 12 is torsionally deformed about its axis 0 in the direction of arrow N as indicated by the long dashed double-shorted dashed line. At this time, when the first opposing wall portion 34C of the door inner panel 30 is pushed outward (the direction of arrow P) in the vehicle width direction by the torsionally deformed front pillar 12, the first opposing wall portion 34C and the front end portion 52F of the extension 52 welded to the first opposing wall portion 34C become deformed in such a way that they move away from one another in the plate thickness direction, so that it becomes easy for the front end portion 52F of the extension 52 to detach from the first opposing wall portion 34C. Likewise, when the first opposing wall portion 34C of the door inner panel 30 is pushed outward (the direction of arrow P) in the vehicle width direction by the torsionally deformed front pillar 12, it becomes easy for the front end portion 50F of the impact beam 50 to detach from the impact beam securing portion 54 of the extension 52. For this reason, there is the potential for the impact beam 50 to no longer function as a beam (a fixed-fixed beam).

In contrast, in the side door 20 pertaining to the present embodiment, as shown in FIG. 4A, the through hole 36 serving as a weak portion is formed in the second opposing wall portion 32A of the door inner panel 30. The area of the second opposing wall portion 32A around the through hole 36 is lower in vehicle width direction rigidity compared to other areas of the second opposing wall portion 32A. That is, it becomes easy for the second opposing wall portion 32A to be crushed in the vehicle width direction taking the through hole 36 as an origin. Furthermore, in the side door 20 pertaining to the present embodiment, the extension 52 overlaps the through hole 36 as seen from the outer side in the vehicle width direction. Consequently, when the impact beam 50 has been displaced toward the cabin 22 side, the area of the second opposing wall portion 32A around the through hole 36 is pushed toward the cabin 22 side by the extension 52.

Because of this, as indicated by the long dashed double-short dashed line, when the second opposing wall portion 32A is crushed inward in the vehicle width direction, the first opposing wall portion 34C is displaced rearward in the vehicle front and rear direction from the vehicle width direction outer side of the front pillar 12 before the door inner panel 30 is displaced as a whole toward the cabin 22 side, that is, before the front pillar 12 is torsionally deformed or before the torsional deformation of the front pillar 12 becomes greater. Thereafter, as indicated by the long dashed double-short dashed line in FIG. 4B, when the door inner panel 30 is further displaced toward the cabin 22 side, the vehicle front and rear direction rear end portion side of the front pillar 12 is pushed toward the cabin 22 side and the front pillar 12 is torsionally deformed about its axis O in the direction of arrow N.

Figure 4B:
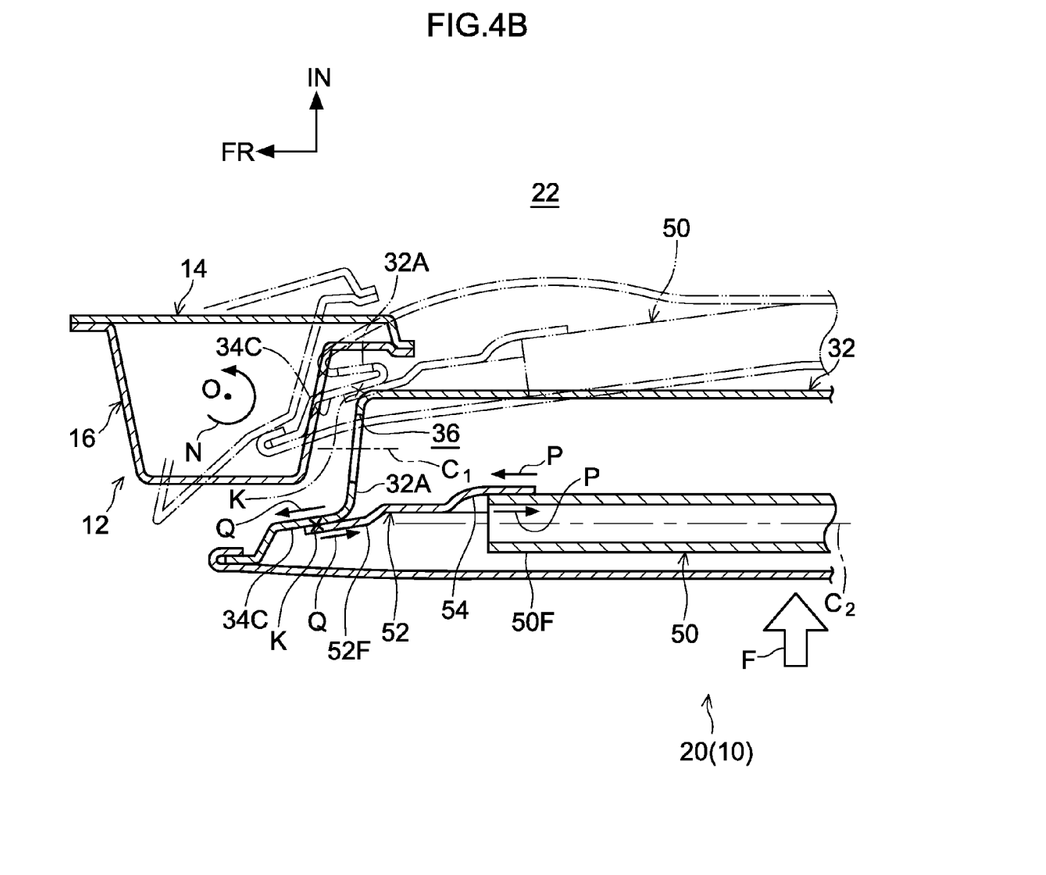
FIG. 4B is a sectional view corresponding to FIG. 1 schematically showing a deformed state, at the time of a side impact, of the front side door and a front pillar shown in FIG. 1.

In this way, in the present embodiment, because the second opposing wall portion 32A is crushed inward in the vehicle width direction, the first opposing wall portion 34C is displaced rearward in the vehicle front and rear direction from the vehicle width direction outer side of the front pillar 12 before the front pillar 12 is torsionally deformed or before the torsional deformation of the front pillar 12 becomes greater. Consequently, the first opposing wall portion 34C is kept from being pushed outward in the vehicle width direction by the torsionally deformed front pillar 12. As a result, compared to the side door 100 pertaining to the comparative example, the extension 52 is kept from detaching from the first opposing wall portion 34C. Consequently, the function of the impact beam 50 as a beam (a fixed-fixed beam) is maintained. In particular, the present embodiment is effective for a side impact with respect to the vehicle front and rear direction rear side (center pillar side) of the side door 20.

Furthermore, because the second opposing wall portion 32A is crushed toward the cabin 22 side, the first opposing wall portion 34C substantially moves in parallel (substantially advances in tandem) therewith toward the cabin 22 side. For this reason, the welded sites K between the first opposing wall portion 34C and the front end portion 52F of the extension 52 become capable of resisting the side impact load F because of the shear strength (shear deformation) mainly in the directions of arrows Q in the same way as before the second opposing wall portion 32A is crushed even after the second opposing wall portion 32A has been crushed. Likewise, the welded site J between impact beam securing portion 54 of the extension 52 and the front end portion 50F of the impact beam 50 becomes capable of resisting the side impact load F because of the shear strength (shear deformation) mainly in the direction of arrows P in the same way as before the second opposing wall portion 32A is crushed even after the second opposing wall portion 32A has been crushed. Because of this, compared to the side door 100 pertaining to the comparative example, the burden on the welded sites J and K at the time of a side impact is reduced, so the function of the impact beam 50 as a beam (a fixed-fixed beam) is maintained on a long-term basis.

Moreover, in the side door 20 pertaining to the present embodiment, the through hole 36 is positioned between the upper edge portion 52U and the lower edge portion 52L of the extension 52 as seen from the outer side in the vehicle width direction, so the area of the second opposing wall portion 32A around the through hole 36 is pushed toward the cabin 22 side directly by the extension 52. Consequently, compared to a configuration where the extension 52 and the through hole 36 do not lie on top of one another or a configuration where the extension 52 and the through hole 36 partially lie on top of one another as seen from the outer side in the vehicle width direction, it becomes easy for the second opposing wall portion 32A to be crushed toward the cabin 22 side.

Moreover, in the side door 20 pertaining to the present embodiment, the central axis $C_1$ of the through hole 36 is positioned on the extension line of the central axis $C_2$ of the impact beam 50 as seen from the outer side in the vehicle width direction, so the side impact load F input to the impact beam 50 is efficiently transmitted to the area of the second opposing wall portion 32A around the through hole 36 via the extension 52. Consequently, compared to a configuration where the central axis $C_1$ of the through hole 36 is in a position outer side the extension line of the central axis $C_2$ of the impact beam 50 as seen from the outer side in the vehicle width direction, it becomes easy for the second opposing wall portion 32A to be crushed toward the cabin 22 side.

Moreover, in the present embodiment, the extension 52 can be kept from detaching from the first opposing wall portion 34C at the time of a side impact by a simple configuration wherein the through hole 36 is formed in the second opposing wall portion 32A. Consequently, the manufacturing cost of the door inner panel 30 can be reduced.

Moreover, for example, by using as the through hole 36 a wire harness through hole through which is inserted a wire harness connected to speaker disposed inside the side door 20 or a motor for raising and lowering a window glass, the manufacturing cost of the door inner panel 30 can be reduced because it becomes unnecessary to form a new through hole in the second opposing wall portion 32A.

As examples of holes usable as the through hole 36, a door hinge bracket attachment hole through which is passed a bolt or the like for securing a door hinge bracket to the second opposing wall portion 32A or a door check through hole through which is passed a door check (door closer) that controls the speed at which the side door 20 opens and closes are conceivable. Furthermore, for example, in a case where the door inner panel 30 is immersed in paint in the step of painting the door inner panel 30, a paint flow-through hole for allowing the paint to flow between the inside and the outer side of the door inner panel 30 may also be used as the through hole 36. Moreover, for example, when welding a weld piece to the door inner panel 30, it is also possible to use as the through hole 36 a welding reference hole for positioning the door inner panel 30 and the weld piece.

Next, example modifications of the vehicle side door structure pertaining to the above embodiment will be described.

In the above embodiment, the through hole 36 is positioned between the upper edge portion 52U and the lower edge portion 52L of the extension 52, and the extension 52 overlaps the entire through hole 36 as seen from the outer side in the vehicle width direction, but the embodiment is not limited to this. It suffices as long as the extension 52 overlaps at least part of the through hole 36 as seen from the outer side in the vehicle width direction.

Furthermore, in the above embodiment, the central axis $C_1$ of the through hole 36 is positioned on the extension line of the central axis $C_2$ of the impact beam 50 as seen from the outer side in the vehicle width direction, but depending on the positional relationship between the through hole 36 and the impact beam 50, the central axis $C_1$ of the through hole 36 may also be positioned on the central axis $C_2$ of the impact beam 50 as seen from the outer side in the vehicle width direction.

Moreover, the central axis $C_2$ of the impact beam 50 or the extension line of the central axis $C_2$ may also lie on top of a section other than the central axis $C_1$ of the through hole 36 as seen from the vehicle width direction. Because of this, compared to a configuration where the central axis $C_2$ of the impact beam 50 or the extension line of the central axis $C_2$ does not lie on top of the through hole 36 as seen from the vehicle width direction, the side impact load F input to the impact beam 50 at the time of a side impact (see FIG. 1) can be efficiently transmitted to the area of the second opposing wall portion 32A around the through hole 36. It is not invariably necessary for the central axis $C_2$ of the impact beam 50 or the extension line of the central axis $C_2$ to lie on top of the through hole 36 when seen from the outer side in the vehicle width direction.

Furthermore, in the above embodiment, the one through hole 36 is formed as a weak portion in the second opposing wall portion 32A of the door inner panel 30, but plural through holes may also be formed as weak portions in the second opposing wall portion 32A. Furthermore, the size and shape of the through hole can be appropriately changed. Moreover, it is also possible to form, for example, a cutout, a slit, a concave portion, or a convex portion serving as the weak portion in the second opposing wall portion 32A. That is, it is possible to form a weak portion appropriately selected from among a through hole, a cutout, a slit, a concave portion, and a convex portion in the second opposing wall portion 32A. Furthermore, it is also possible to appropriately combine, and form in the second opposing wall portion 32A, a through hole, a cutout, a slit, a concave portion, and a convex portion.

Moreover, in the above embodiment, the impact beam 50 is formed by a tubular pipe member, but the embodiment is not limited to this. The impact beam 50 may also be formed by a tabular pressed member (an impact bar), for example. In this case, the impact beam and the impact beam extension may be integrally formed, or an impact beam and an impact beam extension that have been separately formed may be joined together by welding or the like.

Moreover, the above embodiment is not limited to the vehicle front and rear direction front end portion side of the front side door 20 and is also applicable to the vehicle front and rear direction rear end portion side of a rear side door. That is, the above embodiment is also applicable to the rear pillar side of a rear side door. Because of this, in accompaniment with the torsional deformation of the rear pillar at the time of a side impact, the impact beam extension disposed on the rear end portion serving as the lengthwise direction end portion of the impact beam is kept from detaching from the first opposing wall portion formed on the rear end portion side serving as the vehicle front and rear direction end portion side of the door inner panel.

Furthermore, all publications, patent applications, and technical standards described in the present specification are incorporated herein by reference to the same extent as if each publication, patent application, or technical standard was specifically and individually indicated to be incorporated by reference.

An embodiment of the present invention has been described above, but the present invention is not limited to this embodiment; it goes without saying that the embodiment and various example modifications may also be appropriately combined and used and that the present invention can be implemented in a variety of ways without departing from the gist of the present invention. With the vehicle side door structure pertaining to the present invention, the same effects can be expected not only in a side impact resulting from a barrier (MDB side impact) but also in an oblique pole side impact.

The invention claimed is:

1. A vehicle side door structure comprising:
a door inner panel that is disposed along a vehicle front and rear direction, including a front end portion disposed at an outer side of a pillar, as viewed in a vehicle width direction, a first opposing wall portion disposed at the outer side of the pillar in the vehicle width direction, and a second opposing wall portion that is bent inward from the first opposing wall portion so as to extend toward an inside of the vehicle and face the pillar in the vehicle front and rear direction;
a door outer panel that is disposed on an outer side of the door inner panel, opposes the door inner panel in the vehicle width direction, and has a peripheral edge portion joined to a peripheral edge portion of the front end portion of the door inner panel;
an impact beam that is disposed between the door inner panel and the door outer panel wherein a lengthwise direction of the impact beam coincides with the vehicle front and rear direction; and
an impact beam extension formed of a single metal plate is provided at a lengthwise direction end portion of the impact beam, is overlaid on the first opposing wall portion, is welded to the first opposing wall portion, and overlaps at least part of a weak portion formed in the second opposing wall portion as viewed in the vehicle width direction, wherein
the weak portion includes a through hole formed in the second opposing wall portion, wherein the though hole defines a hollow space being free from any structure disposed therein; and
the second opposing wall portion is configured to be crushed inward at the weak portion in the vehicle width direction accompanying inward displacement of the impact beam in the vehicle width direction.

2. The vehicle side door structure according to claim 1, wherein the weak portion is positioned between a vehicle up and down direction upper edge portion and lower edge portion of the impact beam extension viewed in the vehicle width direction.

3. The vehicle side door structure according to claim 1, wherein a central axis of the weak portion is positioned on a same horizontal plane as a central axis of the impact beam as viewed in the vehicle width direction.

4. The vehicle side door structure according to claim 1, wherein the through hole is a wire harness through hole, a door hinge bracket attachment hole, a door check through hole, a paint flow-through hole, or a welding reference hole.

* * * * *